(12) United States Patent
Lee et al.

(10) Patent No.: US 9,327,598 B1
(45) Date of Patent: May 3, 2016

(54) MULTI-SPEED TRANSMISSION WITH MECHANICAL ON-OFF CLUTCH

(71) Applicant: GM GLOBAL TECHNOLOGY OPERATIONS LLC, Detroit, MI (US)

(72) Inventors: Chunhao J. Lee, Troy, MI (US); Farzad Samie, Franklin, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 8 days.

(21) Appl. No.: 14/533,141

(22) Filed: Nov. 5, 2014

(51) Int. Cl.
*F16H 3/62* (2006.01)
*B60K 17/08* (2006.01)
*F16H 3/66* (2006.01)
*F16H 3/44* (2006.01)

(52) U.S. Cl.
CPC *B60K 17/08* (2013.01); *F16H 3/62* (2013.01); *F16H 3/66* (2013.01); *F16H 2003/442* (2013.01); *F16H 2200/0065* (2013.01); *F16H 2200/2012* (2013.01); *F16H 2200/2041* (2013.01); *F16H 2200/2043* (2013.01); *F16H 2200/2069* (2013.01); *F16H 2200/2082* (2013.01); *F16H 2200/2084* (2013.01)

(58) Field of Classification Search
CPC .............. F16H 3/66; F16H 2200/2084; F16H 2200/2069; F16H 2200/0065; F16H 2200/2012; F16H 2200/2041; F16H 2200/2043; F16H 2200/2082; F16H 2003/442
See application file for complete search history.

(56) References Cited

U.S. PATENT DOCUMENTS

| | | | |
|---|---|---|---|
| 8,371,982 B2 | 2/2013 | Lee et al. | |
| 8,512,196 B2 * | 8/2013 | Mellet | F16H 3/66 475/275 |
| 2005/0205377 A1 | 9/2005 | Borgerson et al. | |
| 2008/0223681 A1 | 9/2008 | Stevenson et al. | |
| 2011/0136607 A1 | 6/2011 | Samie et al. | |
| 2013/0085029 A1 * | 4/2013 | Ono | B60K 6/365 475/5 |
| 2014/0024488 A1 * | 1/2014 | Goleski | F16H 3/66 475/275 |
| 2014/0038764 A1 * | 2/2014 | Goleski | F16H 3/66 475/275 |
| 2015/0252877 A1 * | 9/2015 | Mellet | F16H 3/62 475/269 |

* cited by examiner

*Primary Examiner* — Faye M Fleming
(74) *Attorney, Agent, or Firm* — Quinn Law Group, PLLC

(57) ABSTRACT

A transmission has four planetary gear sets, four interconnecting members and six torque-transmitting mechanisms selectively engageable in different combinations of four to establish ten forward speed ratios. One of the six torque-transmitting mechanisms is a mechanical on-off clutch that engages to prevent rotation of a first member of a first of the planetary gear sets rotates in a first direction, and freewheels when the first member rotates in an opposing second direction. When engaged, the first member is grounded to a stationary member.

18 Claims, 5 Drawing Sheets

| 82 | 68 | | 60 | 62 | 63 | 64 | 66 |
|---|---|---|---|---|---|---|---|
| R | ← | → | x |  | x |  | x |
|  | 0 | 0 |  |  |  |  |  |
| 1 | → | ← | x |  | * | x |  |
| 2 | → | ← | x | x | x |  |  |
| 3 | → | ← |  | x | x | x |  |
| 4 | → | ← |  | x | x |  | x |
| 5 | → | ← |  | x |  | x | x |
| 6 | → | ← |  |  | x | x | x |
| 7 | ⇢ | — |  | x | x | x | x |
| 8 | ⇢ | — | x |  | x | x | x |
| 9 | ⇢ | — | x | x |  | x | x |
| 10 | ⇢ | — | x | x | x | x | x |
FIG. 2
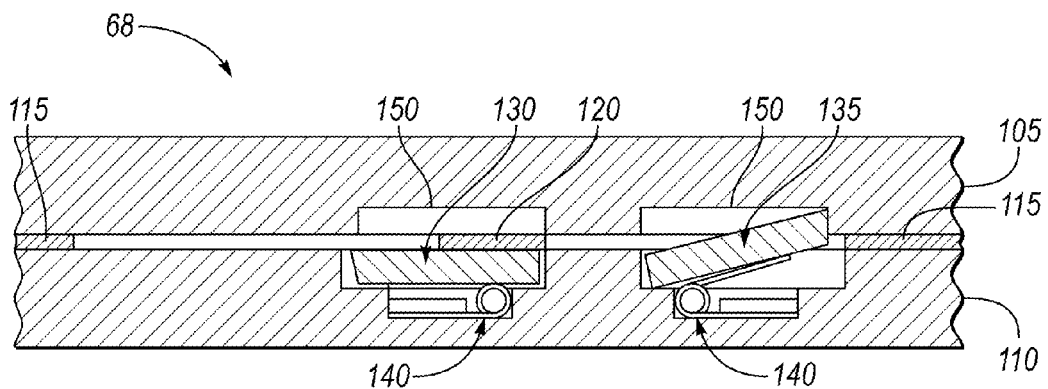
FIG. 3
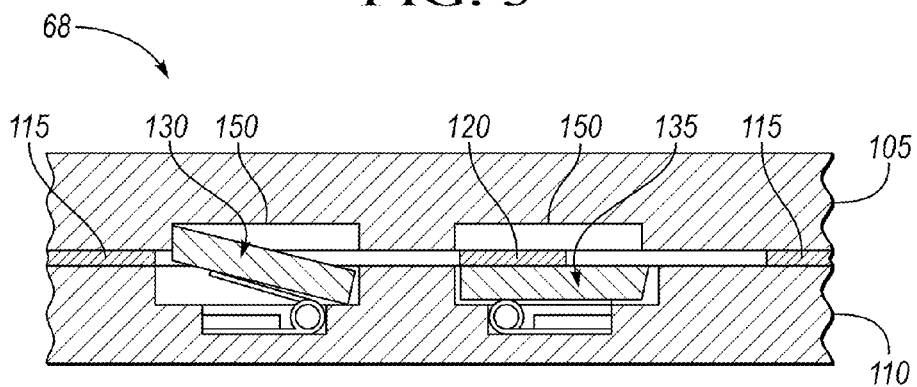
FIG. 4

| 82 | 268 | 60 | 62 | 63 | 64 | 66 |
|---|---|---|---|---|---|---|
| R | x | x |  | x |  | x |
|  |  |  |  |  |  |  |
| 1 | x | x |  | * | x |  |
| 2 | x | x | x | x |  |  |
| 3 | x |  | x | x | x |  |
| 4 | x |  | x | x |  | x |
| 5 | x |  | x |  | x | x |
| 6 | x |  |  | x | x | x |
| 7 |  | x | x | x | x | x |
| 8 |  | x |  | x | x | x |
| 9 |  | x | x |  | x | x |
| 10 |  | x | x | x |  | x |

MULTI-SPEED TRANSMISSION WITH MECHANICAL ON-OFF CLUTCH

TECHNICAL FIELD

The present teachings relate to a multi-speed transmission with a mechanical on-off clutch, and a vehicle with the transmission.

BACKGROUND

Automatic, multi-speed transmissions that incorporate planetary gear sets typically include multiple friction plate-type clutches in order to manipulate the transmission to provide many forward speed ratios. Many such components are necessary to provide six, seven, or eight forward speed ratios. The planetary gear sets and clutches become increasingly difficult to package as they increase in number, and also add to the overall weight of the transmission. Additionally, the control system becomes increasingly complex as the number of friction plate clutches increases.

As is commonly known to those familiar with the art, disengaged multi-plate friction clutches, depending on various conditions, produce drag when there is relative motion between the sets of clutch plates. One characteristic of a disengaged multi-plate clutch is that, as the relative speed between the sets of clutch plates increases, typically, so does the drag or spin loss. This spin loss contributes to decreased fuel economy.

SUMMARY

A transmission for a vehicle is provided that has an input member, an output member, a stationary member, such as the transmission housing, and a hub. The transmission has a first, a second, a third, and a fourth planetary gear set. Each planetary gear set has a first, a second, and a third member. The output member is connected for common rotation with the second member of the fourth planetary gear set. A first interconnecting member continuously connects the second member of the first planetary gear set for common rotation with the first member of the fourth planetary gear set. A second interconnecting member continuously connects the third member of the first planetary gear set for common rotation with the third member of the second planetary gear set. A third interconnecting member continuously connects the first member of the second planetary gear set for common rotation with the third member of the third planetary gear set. A fourth interconnecting member continuously connects the first member of the third planetary gear set for common rotation with the third member of the fourth planetary gear set.

The transmission has six torque-transmitting mechanisms each of which is selectively engageable to connect a respective one of the members of the planetary gear sets with the input member, the stationary member, the hub, or with another respective one of the members of the planetary gear sets. One of the six torque-transmitting mechanisms is a mechanical on-off clutch having a first member fixed to the stationary housing and a second member fixed to the first member of the first planetary gear set. The mechanical on-off clutch is engaged to prevent rotation of the first member of the first planetary gear set in a first direction and freewheels when the first member of the first planetary gear set rotates in an opposing second direction. For example, the mechanical on-off clutch can be a selectable one-way clutch or a dog clutch. The six torque-transmitting mechanisms are engaged in different combinations of four to establish multiple speed ratios of the input member to the output member.

In an embodiment in which the mechanical on-off clutch is a selectable one-way clutch, the selectable one-way clutch is configured to have a first operating mode and a second operating mode, either of which modes may be selected. In the first operating mode, the selectable one-way clutch engages to prevent rotation of a first portion of the selectable one-way clutch relative to a second portion of the selectable one-way clutch in a first direction and freewheels when relative rotation of the first portion of the selectable one-way clutch to the second portion of the selectable one-way clutch is in an opposing second direction. As used herein, "relative rotation" means the difference in the speed of rotation of the first portion and the speed of rotation of the second portion. In the second operating mode, the selectable one-way clutch engages to prevent rotation of the first portion of the selectable one-way clutch relative to the second portion of the selectable one-way clutch in the second direction of rotation and freewheels when relative rotation of the first portion of the selectable one-way clutch to the second portion of the selectable one-way clutch is in the first direction of rotation.

The use of a selectable one-way clutch in the transmission simplifies the clutch control system in comparison to the use of friction plate clutches, as the one-way clutch engages automatically and mechanically (without hydraulic pressure) once it is placed in the designated first or second mode. Spin losses are reduced in comparison to friction plate clutches. Hydraulic supply is not required to maintain an engaged state. Furthermore, in some speed ratios, a glide mode will result when the vehicle operator releases pressure on the accelerator and places little or no pressure on the brakes. In the glide mode, the engine is disconnected from the vehicle wheels. Coasting is smooth, and the engine speed can be reduced to an idle speed or to a complete stop (i.e., to zero speed), improving fuel efficiency. The idle speed is the rotational speed of the engine 12 when the accelerator is not depressed (i.e., the engine is running at rest). An engine braking mode can be established when the clutch is engaged and the vehicle operator releases pressure on the accelerator pedal. If a selectable one-way clutch is used as the mechanical on-off clutch, then the glide mode is established when the selectable one-way clutch is in a first operating mode, and the engine braking mode is established when the selectable one-way clutch is in the second operating mode.

The above features and advantages and other features and advantages of the present teachings are readily apparent from the following detailed description of the best modes for carrying out the present teachings when taken in connection with the accompanying drawings.

BRIEF DESCRIPTION OF THE DRAWINGS

FIG. 2 is an engagement schedule for torque-transmitting mechanisms of the transmission of FIG. 1;

FIG. 3 is a schematic cross-sectional fragmentary illustration of an on-off clutch of FIG. 1 that is a selectable one-way clutch (SOWC) in a first operating mode;

FIG. 4 is a schematic cross-sectional fragmentary illustration of the SOWC of FIG. 3 in a second operating mode;

DETAILED DESCRIPTION

Figure 1:
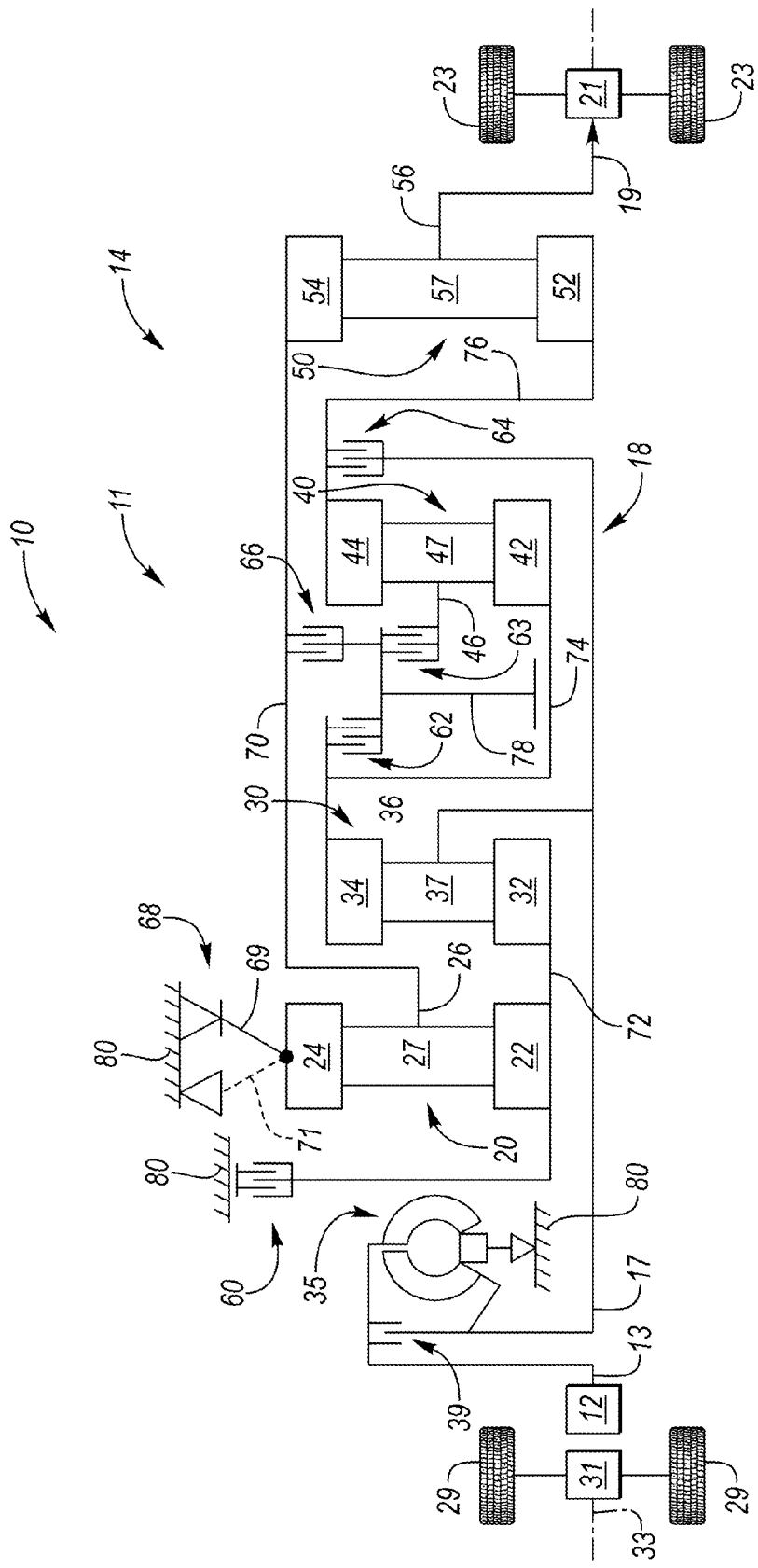
FIG. 1 is a schematic illustration of a first embodiment of a powertrain having an engine and a transmission with a mechanical on-off clutch.

Referring to the drawings, wherein like reference numbers refer to like components throughout the several views, FIG. 1 schematically illustrates a vehicle 10 with an exemplary powertrain 11 that includes an engine 12 with a crankshaft 13 and a planetary transmission 14. The planetary transmission 14 includes an input member 17 operatively connected with the engine 12, a planetary gear arrangement 18, and an output member 19 continuously connected with a final drive mechanism 21 to drive a pair of rear wheels 23. The vehicle 10 also has a pair of front wheels 29 operatively connected by a differential 31. The front wheels 29 are operatively connected to a vehicle frame (not shown) but are not driven by the powertrain 11. The crankshaft 13, input member 17, and the output member 19 are each arranged to rotate about the same axis of rotation 33, and are thus coaxial with one another. Accordingly, the vehicle 10 is a rear wheel-drive vehicle with a longitudinal arrangement of the powertrain 11. The depiction of the transmission 14 in a rear wheel-drive application is only one non-limiting example. The transmission 14 may also be used in a front wheel-drive application by arranging the transmission 14 transversely in the vehicle 10 and operatively connecting the output member 19 to the differential 31 to drive the front wheels 29.

A torque converter 35 with a lockup clutch 39 may be positioned between the engine 12 and the input member 17. The lockup clutch 39 may be engaged when operating conditions warrant a direct connection between the engine 12 and the input member 17. If no torque converter is present, then an isolator may be positioned between the engine 12 and the input member 17.

The planetary gear arrangement 18 includes four planetary gear sets 20, 30, 40 and 50. A first planetary gear set 20 includes a sun gear member 22, a carrier member 26, and a ring gear member 24. The carrier member 26 rotatably supports a set of pinion gears 27 that mesh with both the sun gear member 22 and the ring gear member 24.

The second planetary gear set 30 includes a sun gear member 32, a ring gear member 34, and a carrier member 36 that rotatably supports a set of pinion gears 37 that mesh with both the sun gear member 32 and with the ring gear member 34.

The third planetary gear set 40 includes a sun gear member 42, a ring gear member 44, and a carrier member 46 that rotatably supports a set of pinion gears 47 that mesh with both the sun gear member 42 and with the ring gear member 44.

The fourth planetary gear set 50 includes a sun gear member 52, a ring gear member 54, and a carrier member 56 that rotatably supports a set of pinion gears 57 that mesh with both the sun gear member 52 and with the ring gear member 54.

As used herein, the first member of the first planetary gear set 20 is ring gear member 24, the second member of the first planetary gear set 20 is carrier member 26, and the third member of first planetary gear set 20 is sun gear member 22. The first member of the second planetary gear set 30 is ring gear member 34, the second member of the second planetary gear set 30 is carrier member 36, and the third member of the second planetary gear set 30 is sun gear member 32. The first member of the third planetary gear set 40 is ring gear member 44, the second member of the third planetary gear set 40 is carrier member 46, and the third member of the third planetary gear set 40 is sun gear member 42. The first member of the fourth planetary gear set 50 is ring gear member 54, the second member of the fourth planetary gear set 50 is carrier member 56, and the third member of the fourth planetary gear set 50 is sun gear member 52.

The transmission 14 also includes six torque-transmitting mechanisms 60, 62, 63, 64, 66 and 68. The torque-transmitting mechanisms 62, 63, 64 and 66 are rotating-type torque-transmitting mechanisms, commonly termed clutches. Clutches 62, 63, 64 and 66 are multi-plate friction clutch devices in the embodiment shown. The torque-transmitting mechanism 60 is a friction plate, stationary-type torque-transmitting mechanism, commonly termed a brake or reaction clutch. The torque-transmitting mechanism 68 is a mechanical on-off clutch. In the embodiment shown, the mechanical on-off clutch 68 is a selectable one-way clutch SOWC 68, also referred to as a selectable one-way braking clutch, and is discussed in greater detail below with respect to FIGS. 3 and 4. The torque-transmitting mechanism 60 is referred to herein as a first torque-transmitting mechanism. The torque-transmitting mechanism 62 is referred to herein as the second torque-transmitting mechanism. The torque-transmitting mechanism 63 is referred to herein as the third torque-transmitting mechanism. The torque-transmitting mechanism 64 is referred to herein as the fourth torque-transmitting mechanism. The torque-transmitting mechanism 66 is referred to herein as the fifth torque-transmitting mechanism. The SOWC 68 is also referred to herein as a sixth torque-transmitting mechanism.

A first interconnecting member 70 continuously connects carrier member 26 for common rotation with ring gear member 54. A second interconnecting member 72 continuously connects sun gear member 22 for common rotation with sun gear member 32. A third interconnecting member 74 continuously connects ring gear member 34 for common rotation with sun gear member 42. A fourth interconnecting member 76 continuously connects ring gear member 44 for common rotation with sun gear member 52.

The input member 17 is continuously connected for common rotation with carrier member 36. The output member 19 is continuously connected for common rotation with the carrier member 56. Ring gear member 24 is selectively grounded to a stationary member 80 by engagement of SOWC 68. The stationary member 80 may be a transmission housing, and may be referred to as such. The sun gear member 22 and the sun gear member 32 are selectively grounded to the stationary member by engagement of torque-transmitting mechanism 60. Ring gear member 34 is selectively connected for common rotation with a hub 78 by engagement of clutch 62. Carrier member 46 is selectively connected for common rotation with the hub 78 by engagement of clutch 63. The input member 17 and the carrier member 36 are selectively connected for common rotation with the ring gear member 44 and the sun gear member 52 by engagement of torque-transmitting mechanism 64. The carrier member 26 and the ring gear member 54 are selectively connected for common rotation with the hub 78 by engagement of torque-transmitting mechanism 66.

FIG. 2 is a clutching table, describing operation of the torque-transmitting mechanisms of transmission 14 in various speed ratios. In the table of FIG. 2, an "X" denotes an engaged clutch or brake. An "O" denotes that the torque-transmitting mechanism is engaged, but not holding torque, such as in a garage shift. An asterisk "*" denotes an engaged state in which the torque-transmitting mechanism is not carrying torque. Solid arrows also represent an engaged state, as described below. The torque-transmitting mechanisms 60, 62, 63, 64, 66 and 68 are selectively engaged in combinations of four to provide multiple speed ratios 82 of the input member 17 to the output member 19. Ten forward speed ratios 1st through 10th are denoted 1-10 in FIG. 2, and a reverse speed ratio is denoted R in FIG. 2. Ten different positive numerical speed ratios of speed of the input member to the speed of the output member correspond with the ten forward speed ratios. The reverse speed ratio R is a negative numerical ratio of the speed of the input member 17 to the speed of the output member 19.

With respect to the SOWC 68 in FIG. 2, the column on the left indicates the operating mode of the SOWC 68 selected for forward or reverse propulsion of a vehicle with powertrain 10 without engine braking. The column on the right indicates the operating mode of the SOWC 68 selected for engine braking. Engine braking in an automatic transmission will occur when a driver removes their foot from the accelerator to allow the vehicle to slow down at least in part due to the compression and friction from moving parts of the engine.

Referring to the column on the left, a first operating mode of the SOWC 68 is selected in the 1st through 10th forward speed ratios. In the first operating mode, the solid arrows pointing to the right indicate that the SOWC 68 engages in the 1st through 6th forward speed ratios to prevent rotation of the ring gear member 24 in the opposite direction of rotation as the input member 17 and the carrier member 36. A forward direction of rotation is the direction of rotation of the input member 17 in a forward speed ratio. As used herein "a first direction" is opposite to the forward direction of rotation and "a second direction" is the same the forward direction of rotation. The dashed arrows corresponding with the 7th through 10th forward speed ratios indicate that the SOWC 68 freewheels in the first operating mode when the member 24 rotates in the same direction of the rotation of the input member 17 and the carrier member 36. Thus, in the first operating mode, the SOWC 68 provides reaction torque in the 1st through 6th forward speed ratios and freewheels in the 7th through 10th forward speed ratios. In the reverse speed ratio R 82, the solid arrow pointing to the left indicates that a second operating mode of the SOWC 68 is selected in which the SOWC 68 engages to prevent rotation of the ring gear member 24 in the same direction of rotation as the input member 17 and the carrier member 36, and freewheels when the ring gear member 24 rotates in the opposite direction of rotation as the input member 17 and the carrier member 36. The shift from the 6th to the 7th forward speed ratio is a freewheeling shift.

The column on the right below the SOWC 68 in FIG. 2 indicates the operating modes selected for the SOWC 68 when engine braking is desired. The second operating mode is selected in the 1st through 6th forward speed ratios. Thus, in the second operating mode, the SOWC 68 provides reaction torque for engine braking in the 1st through 6th forward speed ratios. The mode of the SOWC 68 does not affect engine braking in the 7th through 10th forward speed ratios, so dashes are shown in FIG. 2 in those speed ratios.

The SOWC 68 is shown schematically in FIG. 1, with a switch element 69 selected to the first operating mode. This operating mode causes the transmission housing 80 to provide reaction torque and prevent rotation of the ring gear member 24 in the reverse direction (i.e., a first direction of rotation opposite to the direction of rotation of the input member 17), but allows the ring gear member 24 to freewheel in a forward direction of rotation (i.e., a second direction of rotation the same as the direction of rotation as the input member 17). The switch element 69 is selectively movable to the second operating mode, the position 71, shown with dashed lines. In the position 71, the SOWC 68 will freewheel to allow the ring gear member 24 to rotate in the reverse direction and provides reaction torque and prevents rotation of the ring gear member 24 in a forward direction of rotation.

The first operating mode of the SOWC 68 is shown in FIG. 3 and the second operating mode of the SOWC 68 is shown in FIG. 4. The first member 105 is an outer race of the SOWC 68. In the embodiment of FIG. 1, the first member 105 is splined to or otherwise fixed to the transmission housing 80. The second member 110 is an inner race of the SOWC 68. In the embodiment of FIG. 1, the second member 110 is splined to or otherwise fixed to the ring gear member 24. The second member 110 is referred to as a first portion of the SOWC 68 and the first member 105 is referred to as a second portion of the SOWC 68. A snap ring may be used to keep the SOWC 68 in place.

The SOWC 68 may be a controllable mechanical diode clutch, a selectable roller clutch design, or another selectable (reversible) one-way clutch design. The SOWC 68 may be hydraulically actuated by a piston and a valve, electrically by a solenoid, or otherwise actuated. A number of clutch designs capable of functioning as an SOWC are envisioned, and this disclosure is not intended to be limited to the particular exemplary embodiments described herein.

Several methods are known to implement an SOWC. Struts, rockers, rollers, or sprags are different features that can be utilized to selectively couple or decouple the members of the clutch. FIGS. 3 and 4 illustrate in cross-section the SOWC 68 selecting between the first operating mode (FIG. 3) and the second operating mode (FIG. 4), in accordance with the present disclosure. The SOWC 68 comprises the first member 105, the second member 110, a selector plate 115, a selector plate actuation feature 120, a first engagement element 130, a second engagement element 135, two return springs 140, and two engagement features 150. The second member 110 and the selector plate 115 can be rotatable features centered around the common axis of rotation 33 of FIG. 1. The members 105 and 110 may be flat circular plates. Selector plate 115 is sandwiched between the two members and generally moves or remains fixed with second member 110. Selector plate 115 includes selector plate actuation feature 120. Selector plate 115 is movable relative to first member 105 by some small rotational angle, so as to provide calibrated movement of selector plate actuation feature 120. Engaging elements 130 and 135, illustrated as struts in this exemplary embodiment, are rotatingly located to the second member 110, are oriented substantially normally to the radius of the second member 110, and provide the selective coupling and decoupling functions served by the SOWC 68. Each engaging element 130, 135, when in an up position, fixedly fits against an engagement feature 150 in first member 105 and prevents second member 110 from rotating relative to first member 105 in one direction. The engagement elements 130, 135 are normally in an up position due to forces exerted by return springs 140. Selector plate 115 can be actuated relative to the engaging elements 130, 135, such that selector plate actuation feature 120 can be used to depress one of the engagement elements 130, 135 into a down position. The action of the engagement to stop relative rotation depends upon the geometry of the interacting features. If one of the engagement elements 130, 135 is in a down position, then the SOWC 68 can freewheel in the direction normally prohibited by the engagement feature in the down position.

FIG. 3 illustrates SOWC 68 with one engagement element in a down position and one engagement element in an up position. Engagement element 135 is in an up position and is fit against an engagement feature 150. As a result, second member 110 cannot rotate to the right in FIG. 3 (clockwise) relative to first member 105. However, engagement element 130 is in a down position. Engagement feature 135 provides substantially zero resistance to second member 110 rotating to the left in FIG. 3 (counterclockwise) relative to first member 105. When relative rotation occurs and first member 105 comes into contact with engagement element 135, pressure upon the top, nearly horizontal surface of engagement element 135 creates a downward rotation of engagement element 135. This ratcheting motion of engagement element 135 can continue as engagement element 135 rotates past subsequent engagement features 150. The state of the SOWC 68 in FIG. 3 is consistent with the switch 69 selecting the first operating mode, preventing rotation of the second member 110 (and thus the ring gear member 24) in the first direction of rotation (i.e., rotation to the right in FIG. 3, opposite to the direction of rotation of the input member 17), but allowing second member 110 and thus ring gear member 24 to freewheel in a second direction of rotation (i.e., rotation to the left in FIG. 3, the same direction of rotation as the input member 17).

FIG. 4 illustrates SOWC 68 with engagement element 130 in an up position and engagement element 135 in a down position. Selector plate 115 is actuated relative to the engagement elements such that engagement element 135 is depressed by actuation feature 120 and engagement element 130 is not depressed. As a result, rotation of second member 110 in a direction to the left (the forward direction or second direction) relative to first member 105 is not possible. The second member 110 can freewheel in a direction to the right (the first direction). The state of the SOWC 68 in FIG. 4 is consistent with the switch 69 selecting the second operating mode, preventing rotation of the second member 110 and thus ring gear member 24 in the second direction of rotation (the direction of rotation of the input member 17), and allowing freewheeling of the ring gear member 24 in the first direction of rotation (the direction of rotation opposite to the direction of rotation of the input member 17).

It will be appreciated that the members of an SOWC 68 are likely to have a plurality of features 130, 135, each actuated simultaneously to allow or prevent rotation in either direction, with the total torque transmitted through the SOWC 68 distributed between the SOWC features 130, 135. When features 135 are in the up position and features 130 are in the down position, the SOWC 68 is in the first mode described above. When features 130 are in the up position and features 135 are in the down position, the SOWC 68 is in the second mode described above. The SOWC 68 can be configured to have a third mode, referred to as a lock-lock mode, when both sets of features 130, 135 are in the up position, and rotation is prevented in both directions. The SOWC 68 can be configured to have a fourth mode that is a neutral mode in which both sets of features 130, 135 are in the down position, and the clutch can freewheel in both directions of rotation. The selector plate 115 may have spaced actuation features to accomplish the third and fourth modes. For example, if the selector plate 115 is moved slightly to the right in FIG. 3, so that the actuation feature 120 is centered between the engagement features 150, both sets of features 130, 135 are in the engaged position and the lock-lock mode is accomplished. Two separately movable selector plates 105 could be used to accomplish a fourth mode in which each selector plate holds a different set of the features 130, 135 in the down position. Although four modes may be available, the SOWC 68 need only have two modes for carrying out the first and second operating modes set forth in FIG. 2. If a SOWC is used that has only two modes, the two modes would most likely be the first mode (features 135 up and features 130 down), and the lock-lock mode. Similar SOWC features are known in the art for a rocker mechanism with a pair of engagement elements located at distal ends of the rocker, capable similarly of preventing or enabling relative rotation, in combination with engagement features on an opposing member, based upon rocking actuation of the rocker. Rollers or sprags can alternatively be used in members located one radially inside the other, with a gap between the members. The rollers or sprags can be actuated to interact within the gap to selectively couple the members in one or both directions of rotation.

Application of an SOWC, as described above, to an automatic transmission can reduce parts and increase fuel efficiency. Yet, when the SOWC 68 needs to be engaged, slip across the clutch must substantially equal zero. There can be no relative rotation (i.e., slip) between the members 105, 110; that is, both members 105, 110 of the SOWC 68 need to be stationary. Additionally, to disengage a SOWC, the torque carried by the clutch needs to be zero.

In the embodiment of FIG. 1, the SOWC 68 allows a glide mode in which smooth coasting of the vehicle 10 can occur during the 1st to the 6th forward speed ratios of FIG. 2. Coasting will occur when the vehicle operator releases the accelerator and puts little or no pressure on the vehicle brakes. Under these conditions, the speed of the input member 17 decreases, and no torque will go through the ring gear member 24. Because the SOWC 68 is in the first operating mode, the SOWC 68 will overrun. No torque will be transmitted from the input member 17 to the output member 19. The engine 12 is thus disconnected from the pair of rear wheels 23. The speed of the engine 12 can decrease to an engine idle speed or zero, increasing fuel economy. The speed of the output member 19, and thus of the pair of rear wheels 23, as well as the pair of front wheels 29, can smoothly coast downward without the engine 12 connected to the output member 19. The SOWC 68 also allows an engine braking mode in which slowing of the vehicle 10 can occur during the 1st to 6th forward speed ratios of FIG. 2 when the vehicle operator releases the accelerator and puts little or no pressure on the vehicle brakes. Under these conditions, the speed of the input member 17 decreases, causing torque through the transmission 14 to place a torque on the ring gear member 24 in the second direction of rotation in FIG. 4 (i.e., to the left in FIG. 4). Because the SOWC 68 is in the second operating mode, the SOWC 68 will engage. Engine friction will further slow the input member 17 and will help to slow the pair of rear wheels 23 as the engine 12 is operatively connected with the pair of rear wheels 23. This will enable the engine 12 to be controlled in a deceleration fuel cut-off mode.

Figures 5, 6:
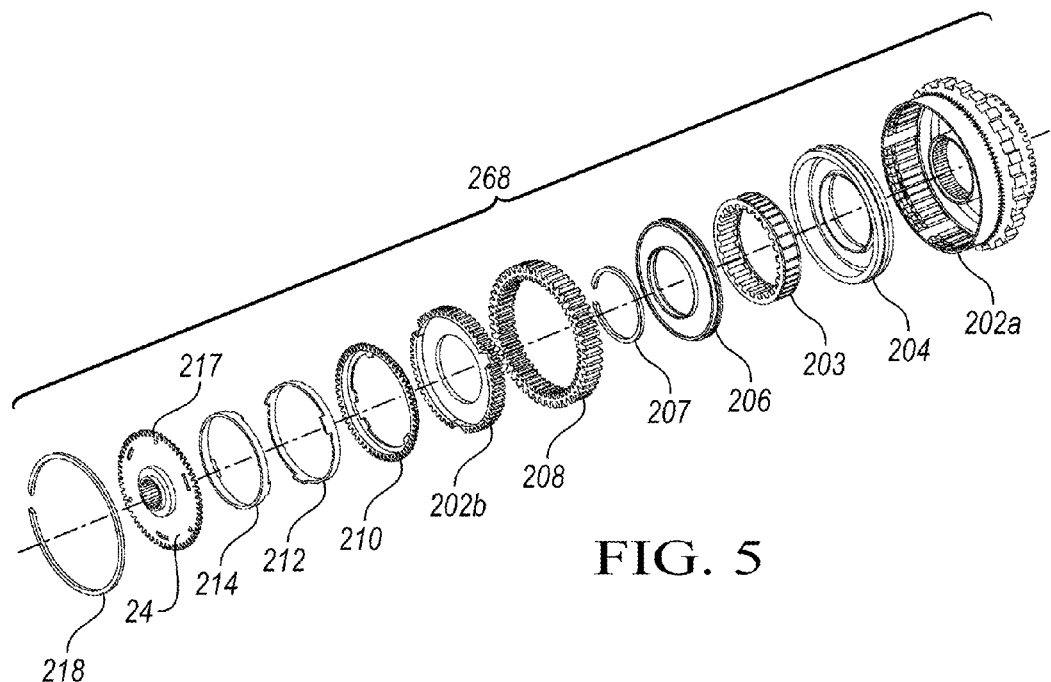
FIG. 5 is a schematic illustration in exploded perspective view of a mechanical on-off clutch for use in FIG. 1 that is a dog clutch.
FIG. 6 is an engagement schedule for torque-transmitting mechanisms of the transmission of FIG. 1 with the dog clutch of FIG. 5 as the mechanical on-off clutch.

FIG. 5 illustrates another embodiment of a mechanical on-off clutch 268 that can be used in place of the SOWC 68 in the transmission 14 of FIG. 1. The mechanical on-off clutch 268 is a dog clutch and can be utilized to substantially reduce parasitic losses, and thereby improve fuel economy. A dog clutch can be utilized to engage a rotating, transmission component with a stationary component so that both components are stationary while avoiding a transmission bump, or noticeable impulse load. A dog clutch can be selectively activated to engage or ground, and deactivated to disengage or unground a particular transmission component when the transmission changes operating modes (e.g., to ground the ring gear member 24 when the transmission 14 shifts from the 7th forward speed ratio to the 6th forward speed ratio).

Figure 7A:
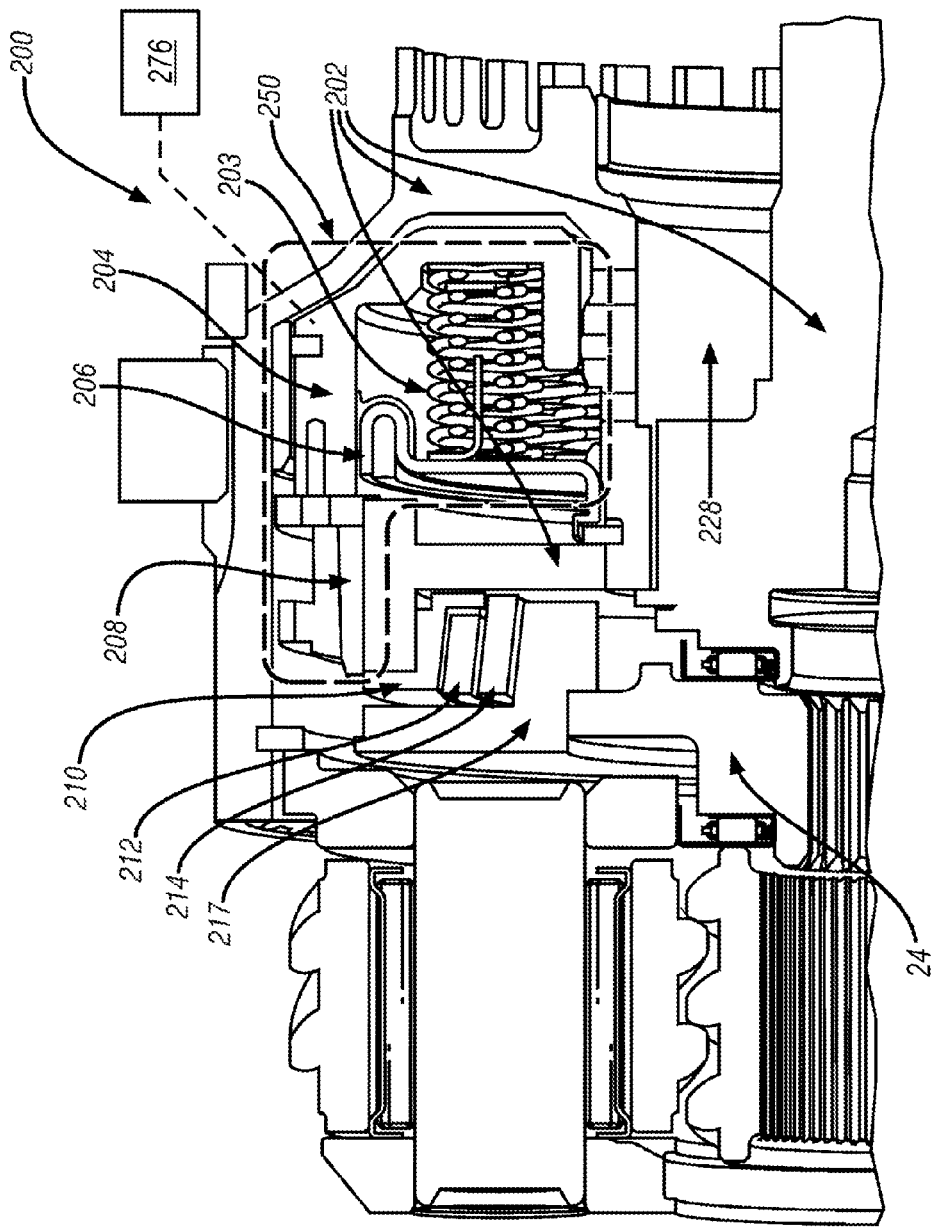
FIG. 7A is a schematic illustration in fragmentary side view of the dog clutch of FIG. 5 in a disengaged state or off position.
Figure 7B:
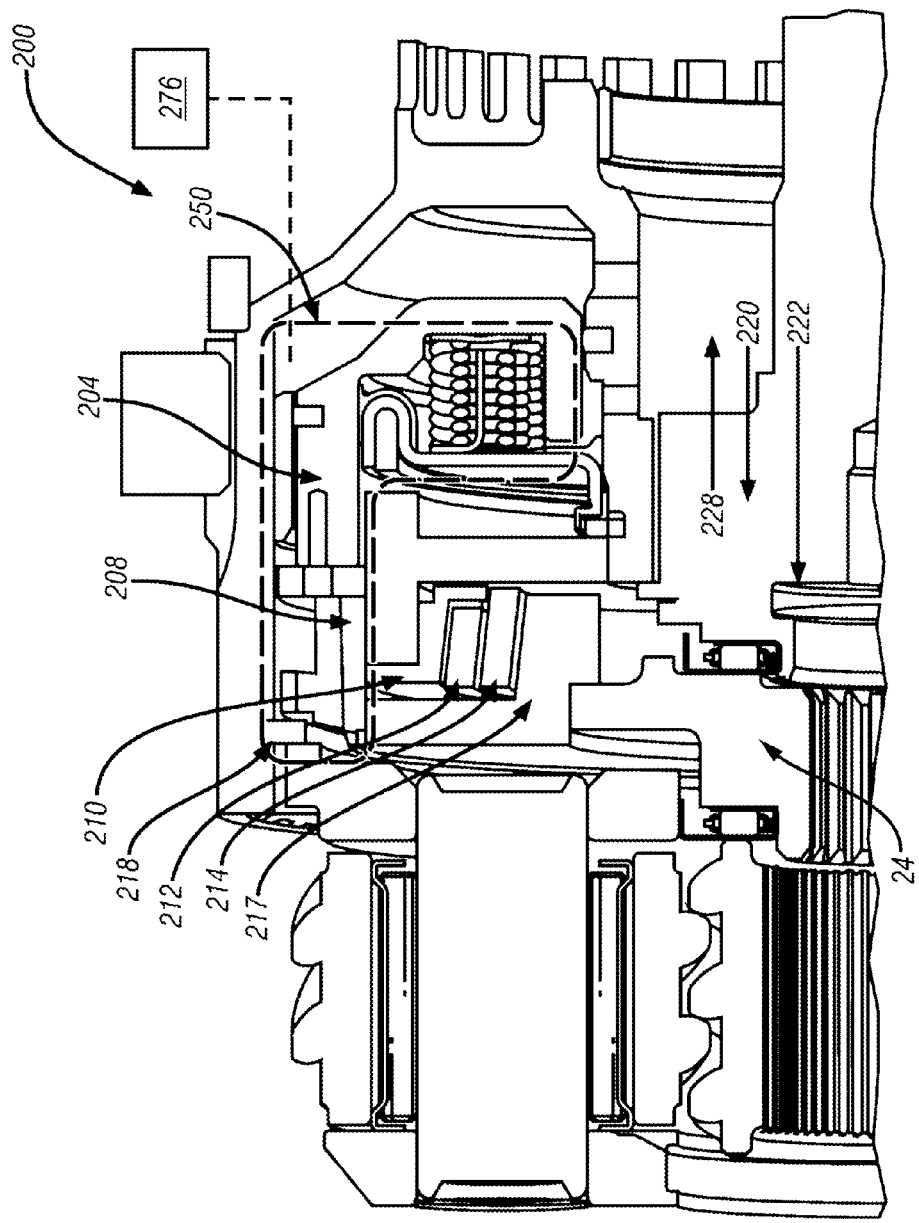
FIG. 7B is a schematic illustration in fragmentary side view of the dog clutch of FIG. 5 in an engaged state or on position.

FIGS. 5, 7A and 7B illustrate the exemplary dog clutch 268. As discussed above, the dog clutch 268 can be used to smoothly engage the ring gear member 24 with the stationary member 80 while avoiding a transmission bump, or noticeable impulse load. Referring to FIG. 7A, the dog clutch 268 can be selectively deactivated to a disengaged state, wherein the ring gear member 24 rotates independently, and thus is permitted to free-wheel. The dog clutch 268 is in the disengaged state in the 7th through the 10th forward speed ratios. Referring to FIG. 7B, the dog clutch 268 can be selectively activated to an engaged state, wherein the ring gear member 24 is grounded to the stationary member 80. The dog clutch 268 is in the engaged state in the forward speed ratios.

Still referring to FIGS. 7A and 7B, the exemplary dog clutch 268 ensures smooth engagement by substantially matching the zero rotational speed between the ring gear member 24 and the stationary member 80. The dog clutch 268 includes output components preferably including a housing assembly 202 that is splined to the housing 80, a biasing member 203, a piston member 204, a piston balance member 206, a sleeve member 208, a blocker member 210 and an output cone 214. The dog clutch 268 also includes input components preferably including an input cone 212, the ring gear member 24 and ring gear member teeth 217. Furthermore, and discussed in greater detail herein, the dog clutch 268 has a clutching mechanism 250 that includes the piston member 204, the piston balance member 206, the biasing member 203 and the sleeve member 208.

Referring again to FIG. 7A, when the dog clutch 268 is in the disengaged state, power is not transferred between the input and the output components of the dog clutch 268. When the dog clutch 268 is disengaged, the output components including the housing assembly 202, the biasing member 203, the piston member 204, the piston balance 206, the sleeve member 208 and the output cone 214 are all stationary. The input components including the ring gear member 24, the ring gear member teeth 217 and the input cone 212 rotate together at the same speed and independently of the output components (i.e., the dog clutch 268 freewheels).

Referring to FIG. 7B, the dog clutch 268 is shown selectively activated and in the engaged state, wherein power is transferred between the input and output components of the dog clutch 268. Selective actuation of the dog clutch 268 can be provided by a transmission control module (TCM) 276, wherein rotational speeds between the input and output components are controlled at zero rotational speed, and subsequently, the clutching mechanism 250 associated with the dog clutch 268 attains engagement between the input and output components. A speed sensor may be mounted to or otherwise operatively connected to the ring gear member 24 and in operative communication with the TCM 276 so that the TCM 276 can determine the rotational speed of the ring gear member 24 based in part on speed information from that speed sensor. The speed of the ring gear member 24 can be calculated based on an input speed sensor, and output speed sensor, and two speed sensors mounted at different positions in the transmission 14. Specifically, the TCM 276 commands the piston member 204 to move the sleeve member 208 causing the sleeve member 208 to longitudinally transfer toward the input components and compress against the blocker member 210. For example, the command from the TCM 276 can cause hydraulic pressure to result in force 220 to move the piston member 204, or the force 220 may be an electromagnetic force. The compression between the sleeve member 208 and the blocker member 210 generates friction between the input and output cones 212, 214, respectively, to cause the input and output speeds of the input and output components to be zero. When the rotational speeds of the input and output components are both at or near zero, the clutch slip between the input and output components is effectively zero. Thus, a smooth transition to effectively engage the input and output components occurs during periods when the measured clutch slip between said input and output components is substantially zero. A person having ordinary skill in the art recognizes that clutch holding torque is zero when the clutch slip is zero. Utilization of the dog clutch 268 enables the rotational speeds of the input and output components to only be within the same range of each other to establish and maintain a clutch slip of substantially zero for optimal smooth engagement between transmission components (i.e., the input and output components).

After the TCM 276 determines that the input and output speeds of the input and output components, respectively, are effectively equal (i.e., clutch slip is substantially zero), the clutching mechanism 250 associated with the dog clutch 268 is activated, wherein a clutching force 222 exerted by the piston member 204 against the sleeve member 208 is provided. A synchronizer 200 may be used. The clutching force 222 longitudinally transfers the sleeve member 208 toward the ring gear member 24, thereby engaging the ring gear member teeth 217 associated with the ring gear member 24 to the sleeve member 208. The longitudinal transfer of the sleeve member 208 is terminated when engagement between the sleeve member 208 and the ring gear member teeth 217 is attained, and the sleeve member 208 contacts an internal snap ring 218.

Likewise, the clutching mechanism 250 associated with the dog clutch 268, when selectively deactivated, is configured to disengage and release the input components from the output components. The biasing member 203 provides a biasing force 228 to return the piston member 204 and the sleeve member 208 back to the disengaged state shown in FIG. 7A. It should be appreciated that torque being transferred between the input and output components must be reduced to substantially zero in order to deactivate the dog clutch 268 and the clutching mechanism 250 associated therewith, and thereby disengage the ring gear member 24 from the stationary member 80.

An exploded view of the dog clutch 268 described in FIGS. 7A and 7B is illustrated in FIG. 5. The dog clutch 268 includes a first housing member 202a, the biasing member 203, the piston member 204, the piston balance member 206, an external retaining ring 207, the sleeve member 208, a second housing member 202b, the blocker member 210, the input cone 212, the output cone 214, the ring gear member 24 and the internal snap ring 218. In a non-limiting example, rotational speeds of rotating transmission components are within the same range as one another (i.e., within a predetermined range of one another suitable for smooth engagement), when the difference between rotational speeds is less than 50 revolutions per minute (RPM). When the rotational speed of the ring gear member 24 is less than or equal to 50 RPM, a clutch slip of substantially zero is established and maintained for optimal smooth engagement between the ring gear member 24 and the stationary member 80, wherein the engagement is provided by clutching mechanism 250 applying the clutching force 222. Engagement between the ring gear member 24 and the stationary member 80 is desired during a shift from the 7th forward speed ratio, numbered 7 in FIG. 6, to the 6th forward speed ratio, numbered 6 in FIG. 6. The dog clutch 268 maintains engagement between the ring gear member 24 and the stationary member 80 during the first through sixth ($1^{st}$-$6^{th}$) forward speed ratios and during the reverse speed ratio R. Likewise, the clutching mechanism 250 associated with the dog clutch 268 is deactivated to disengage the ring gear member 24 from the stationary member 80 during a shift from the 6th forward speed ratio to the 7th forward speed ratio. It is appreciated that disengagement of the ring gear member 24 from the stationary member 80 requires the torque applied by the ring gear member 24 to the stationary member 80 reduce to substantially zero before disengagement can be provided.

With reference to FIGS. 1, 5, 6, and 7A-7B, an algorithm performed by the TCM 276 for providing engagement between the input and output components is described in detail. The rotational speeds of the input and output components to be engaged by the dog clutch 268 are monitored. The algorithm determines if the rotational speeds are within a predetermined range of one another, such as within 50 rpm of one another. If the rotational speeds are not within the predetermined range of each other, the algorithm continues monitoring the rotational speeds. If the rotational speeds of the input and output components are within the predetermined range of each other, the algorithm applies the force 220 and the rotational speeds of the input and output components are monitored until the rotational speeds are equal. When the algorithm determines that the two rotational speeds of the transmission components are equal, the algorithm applies the clutching force 222 to engage the two transmission components to one another and thereby transfer torque therebetween.

Referring to FIG. 5B, the algorithm for disengaging the two transmission components must determine that the amount of torque transferred between input and output components must drop to substantially zero before the dog clutch 268 can be deactivated and disengagement provided. First, the TCM 276 monitors the torque transferred between the input and output components. The algorithm determines if the monitored torque transferred has dropped to substantially zero. If the torque is not substantially zero, the algorithm continues monitoring. If the monitored torque between the input and output components is substantially zero, the dog clutch 268 is deactivated, wherein the biasing force 228 disengages said input and output components from each other.

While the best modes for carrying out the present teachings have been described in detail, those familiar with the art to which the present teachings relate will recognize various alternative designs and embodiments for practicing the present teachings within the scope of the appended claims.

The invention claimed is:

1. A transmission for a vehicle comprising:
an input member;
an output member;
a stationary member;
a rotatable hub;
a first, a second, a third, and a fourth planetary gear set, each planetary gear set having a first, a second, and a third member; wherein the input member is connected for common rotation with the second member of the second planetary gear set;
wherein the output member is connected for common rotation with the second member of the fourth planetary gear set;
a first interconnecting member continuously connecting the second member of the first planetary gear set for common rotation with the first member of the fourth planetary gear set;
a second interconnecting member continuously connecting the third member of the first planetary gear set for common rotation with the third member of the second planetary gear set;
a third interconnecting member continuously connecting the first member of the second planetary gear set for common rotation with the third member of the third planetary gear set;
a fourth interconnecting member continuously connecting the first member of the third planetary gear set for common rotation with the third member of the fourth planetary gear set;
six torque-transmitting mechanisms each of which is engageable to connect a respective one of the members of the planetary gear sets with one of the input member, the stationary member, another respective one of the members of the planetary gear sets or the hub;
wherein one of the six torque-transmitting mechanisms is a mechanical on-off clutch having a first member fixed to the stationary housing and a second member fixed to the first member of the first planetary gear set;
wherein the mechanical on-off clutch is engaged to prevent rotation of the first member of the first planetary gear set in a first direction and freewheels when the first member of the first planetary gear set rotates in an opposing second direction; and
wherein the six torque-transmitting mechanisms are engaged in different combinations of four to establish multiple speed ratios of the input member to the output member.

2. The transmission of claim 1, wherein a first of the six torque-transmitting mechanisms is selectively engageable to connect the third member of the first planetary gear set to the stationary member;
wherein a second of the six torque-transmitting mechanisms is selectively engageable to connect the first member of the second planetary gear set for common rotation with the hub;
wherein a third of the six torque-transmitting mechanisms is selectively engageable to connect the second member of the third planetary gear set for common rotation with the hub;
wherein a fourth of the six torque-transmitting mechanisms is selectively engageable to connect the second member of the second planetary gear set for common rotation with the first member of the third planetary gear set; and
wherein a fifth of the six torque-transmitting mechanisms is selectively engageable to connect the second member of the first planetary gear set for common rotation with the hub.

3. The transmission of claim 1, wherein the first member of the first planetary gear set is a ring gear member, the second member of the first planetary gear set is a carrier member, and the third member of the first planetary gear set is a sun gear member;
wherein the first member of the second planetary gear set is a ring gear member, the second member of the second planetary gear set is a carrier member, and the third member of the second planetary gear set is a sun gear member;
wherein the first member of the third planetary gear set is a ring gear member, the second member of the third planetary gear set is a carrier member, and the third member of the third planetary gear set is a sun gear member; and
wherein the first member of the fourth planetary gear set is a ring gear member, the second member of the fourth planetary gear set is a carrier member, and the third member of the fourth planetary gear set is a sun gear member.

4. The transmission of claim 1, wherein the multiple speed ratios include ten forward speed ratios and a reverse speed ratio.

5. The transmission of claim 1, wherein the mechanical on-off clutch is a dog clutch.

6. The transmission of claim 1, wherein the mechanical on-off clutch is a selectable one-way clutch having a first operating mode and a second operating mode, either of which modes may be selected;
   wherein the mechanical on-off clutch engages to prevent rotation of the first member of the first planetary gear set in the first direction and freewheels when the first member of the first planetary gear set rotates in the opposing second direction when the first operating mode is selected; and
   wherein the mechanical on-off clutch engages to prevent rotation of the first member of the first planetary gear set in the second direction of rotation and freewheels when the first member of the first planetary gear set rotates in the first direction of rotation when the second operating mode is selected.

7. The transmission of claim 1 in combination with an engine operable for providing power to the input member, wherein the engine is operable in an engine braking mode in which retarding forces in the engine slow the engine; wherein the selectable one-way clutch is in the second operating mode to permit power flow during the engine braking mode.

8. The transmission of claim 1 in combination with an engine operable for providing power to the input member; wherein the mechanical on-off clutch freewheels in at least some of said speed ratios when speed of the input member is reduced, thereby preventing power flow from the input member to the output member and permitting speed of the engine to decrease independently of speed of the output member.

9. The transmission and engine of claim 8, wherein the engine reduces to one of an idle speed and zero speed when the mechanical on-off clutch freewheels in the first operating mode.

10. The transmission of claim 1, wherein the mechanical on-off clutch freewheels during a shift between at least two of said ten forward speed ratios.

11. A vehicle comprising:
   a front pair of wheels and a rear pair of wheels;
   an engine having a crankshaft;
   a transmission having:
      an input member;
      an output member;
      a stationary member;
      a rotatable hub;
      a first, a second, a third, and a fourth planetary gear set, each planetary gear set having a first, a second, and a third member; wherein the input member is connected for common rotation with the second member of the second planetary gear set; wherein the output member is connected for common rotation with the second member of the fourth planetary gear set;
      a first interconnecting member continuously connecting the second member of the first planetary gear set for common rotation with the first member of the fourth planetary gear set;
      a second interconnecting member continuously connecting the third member of the first planetary gear set for common rotation with the third member of the second planetary gear set;
      a third interconnecting member continuously connecting the first member of the second planetary gear set for common rotation with the third member of the third planetary gear set;
      a fourth interconnecting member continuously connecting the first member of the third planetary gear set for common rotation with the third member of the fourth planetary gear set;
      six torque-transmitting mechanisms each of which is engageable to connect a respective one of the members of the planetary gear sets with one of the input member, the stationary member, another respective one of the members of the planetary gear sets, or the hub;
      wherein one of the six torque-transmitting mechanisms is a mechanical on-off clutch having a first member fixed to the stationary housing and a second member fixed to the first member of the first planetary gear set;
      wherein the mechanical on-off clutch engages to prevent rotation of the first member of the first planetary gear set in a first direction and freewheels when the first member of the first planetary gear set rotates in an opposing second direction;
      wherein the six torque-transmitting mechanisms are engaged in different combinations of four to establish ten forward speed ratios and a reverse speed ratio of the input member to the output member; and
      wherein the engine and the transmission are arranged with the crankshaft coaxial with the input member and the output member, and with the output member connected to drive the rear pair of wheels.

12. The vehicle of claim 11, wherein a first of the six torque-transmitting mechanisms is selectively engageable to connect the third member of the first planetary gear set to the stationary member;
   wherein a second of the six torque-transmitting mechanisms is selectively engageable to connect the first member of the second planetary gear set for common rotation with the hub;
   wherein a third of the six torque-transmitting mechanisms is selectively engageable to connect the second member of the third planetary gear set for common rotation with the hub;
   wherein a fourth of the six torque-transmitting mechanisms is selectively engageable to connect the second member of the second planetary gear set for common rotation with the first member of the third planetary gear set; and
   wherein a fifth of the six torque-transmitting mechanisms is selectively engageable to connect the second member of the first planetary gear set for common rotation with the hub.

13. The vehicle of claim 11, wherein the first member of the first planetary gear set is a ring gear member, the second member of the first planetary gear set is a carrier member, and the third member of the first planetary gear set is a sun gear member;
   wherein the first member of the second planetary gear set is a ring gear member, the second member of the second planetary gear set is a carrier member, and the third member of the second planetary gear set is a sun gear member;
   wherein the first member of the third planetary gear set is a ring gear member, the second member of the third planetary gear set is a carrier member, and the third member of the third planetary gear set is a sun gear member; and wherein the first member of the fourth planetary gear set is a ring gear member, the second member of the fourth planetary gear set is a carrier member, and the third member of the fourth planetary gear set is a sun gear member.

14. The vehicle of claim 11, wherein the mechanical on-off clutch is a dog clutch.

15. The vehicle of claim 11, wherein the mechanical on-off clutch is a selectable one-way clutch having a first operating mode and a second operating mode, either of which modes may be selected;

wherein the mechanical on-off clutch engages to prevent rotation of the first member of the first planetary gear set in the first direction and freewheels when the first member of the first planetary gear set rotates in the opposing second direction when the first operating mode is selected; and wherein the mechanical on-off clutch engages to prevent rotation of the first member of the first planetary gear set in the second direction and freewheels when the first member of the first planetary gear set rotates in the first direction of rotation when the second operating mode is selected.

16. The vehicle of claim 15, wherein the engine is operable in an engine braking mode in which retarding forces in the engine slow the engine; and wherein the selectable one-way clutch is in the second operating mode during the engine braking mode.

17. The vehicle of claim 11, wherein the mechanical on-off clutch freewheels in at least some of said speed ratios when speed of the input member is reduced, thereby preventing power flow from the input member to the output member and permitting speed of the engine to decrease independently of speed of the output member.

18. The vehicle of claim 11, wherein the mechanical on-off clutch freewheels during a shift between at least two of said ten forward speed ratios.

* * * * *